United States Patent Office 2,813,906
Patented Nov. 19, 1957

2,813,906

1-ACETYL-6-METHOXY-9-METHYL-3,4,5,6,7,8,9,10-OCTAHYDRONAPHTHALENE

James F. McPherson, Elizabeth, N. J., assignor to Merck & Co., Inc., Rahway, N. J., a corporation of New Jersey No Drawing. Application August 15, 1955, Serial No. 528,558

2 Claims. (Cl. 260—586)

This invention is concerned generally with hydronaphthalene compounds and with processes for preparing them. More particularly, it relates to the novel compound 1 - acetyl-6-methoxy-9-methyl-3,4,5,6,7,8,9,10-octahydronaphthalene, to the process of synthesizing this compound starting with 1-acetamido-6-methoxy-naphthalene, and to the novel compounds obtained as intermediates in this synthetic process.

This application is a continuation in part of my copending application, Serial No. 218,535, filed March 30, 1951, now abandoned.

1-acetyl-6-methoxy-9-methyl-3,4,5,6,7,8,9,10-octahydronaphthalene possesses the AB ring system together with angular methylation at position 10, characteristic of certain members of the steroid group of compounds (such as testosterone, progesterone and adrenal hormones such as cortisone). The new compound also possesses the proper functional substitution in ring A, since the methoxy radical of ring A is readily converted to the 3-keto group present in many steroid hormones. 1-acetyl-6-methoxy - 9-methyl-3,4,5,6,7,8,9,10-octahydronaphthalene is capable of further elaboration to a steroid member and is of value as a starting material for the total synthesis of steroid hormones.

The 1-acetyl-6-methoxy-9-methyl-3,4,5,6,7,8,9,10-octahydronaphthalene, subject of the present invention, is prepared by means of a novel process which is conducted as follows: 1-acetamido-6-methoxy-naphthalene (Compound 1 hereinbelow), which can be prepared by the method disclosed in the article by Wilde et al. (J. A. C. S. 69, 3080 (1947)) is reacted with hydrogen in the presence of a hydrogenation catalyst to produce 1 - acetamido - 6 - methoxy-5,6,7,8-tetrahydronaphthalene (Compound 2) which is then reacted with a hydrolyzing agent under alkaline conditions to form 1-amino-6-methoxy-5,6,7,8-tetrahydronaphthalene (Compound 3). The latter compound is then treated with nitrous acid to convert the amino radical to a hydroxy group thereby forming 1 - hydroxy-6-methoxy-5,6,7,8-tetrahydronaphthalene (Compound 4) which, in turn, is reacted with hydrogen in the presence of a hydrogenation catalyst to produce 1-hydroxy-6-methoxy-decahydronaphthalene (Compound 5). The 1-hydroxy-6-methoxy-decahydronaphthalene is reacted with an oxidizing agent to form 1-keto-6-methoxy-decahydronaphthalene (Compound 6); this compound is reacted with ethyl formate in the presence of sodium ethoxide to form 1-keto-2-hydroxymethylene-6-methoxy-decahydronaphthalene (Compound 7); and the latter compound is reacted with isopropyl iodide to form 1 - keto - 2 - isopropoxymethylene - 6-methoxy-decahydronaphthalene (Compound 8). 1-keto-2-isopropoxymethylene-6-methoxy-decahydronaphthalene is then reacted with methyl iodide in the presence of potassium amide to form 1 - keto - 2 - isopropoxymethylene - 6 - methoxy-9-methyl-decahydronaphthalene (Compound 9) which is then reacted with an alkali metal hydroxide to produce 1-keto-6 - methoxy-9-methyl-decahydronaphthalene (Compound 10). The latter compound is treated with acetylene in the presence of potassium tertiary butoxide to form 1-ethynyl - 1-hydroxy-6-methoxy-9-methyl-decahydronaphthalene (Compound 11), and the latter compound is heated with formic acid to produce 1-acetyl-6-methoxy-9-methyl-3,4,5,6,7,8,9,10-octahydronaphthalene (Compound 12). The reaction indicated hereinabove may be chemically represented as follows:

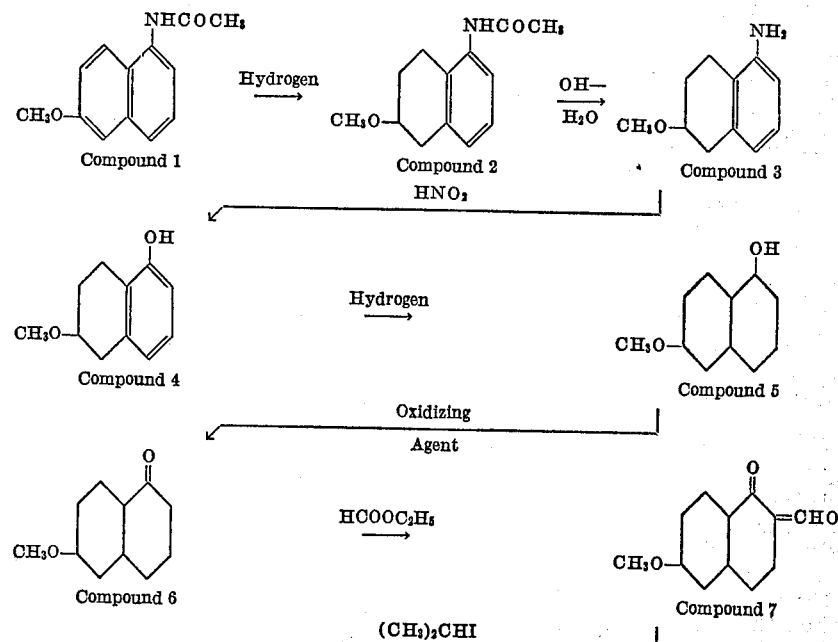

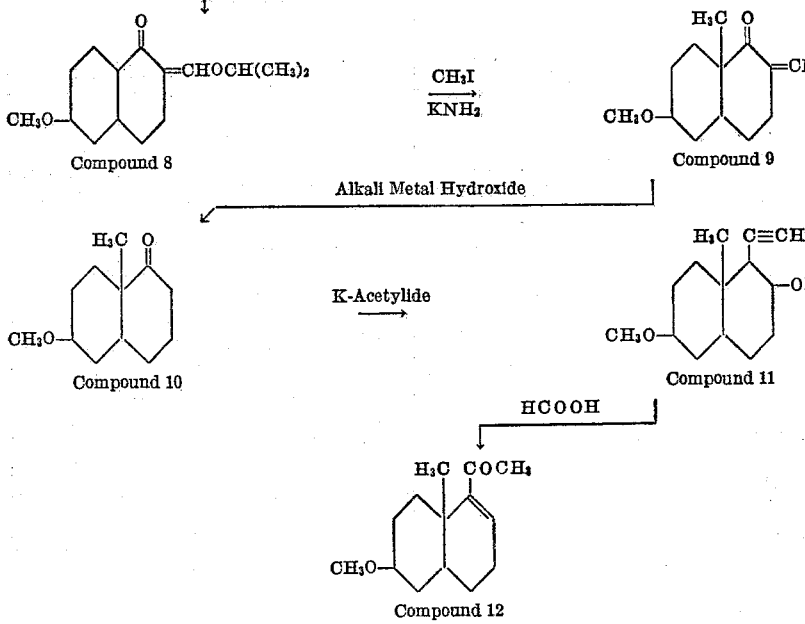

In carrying out the foregoing reactions, the 1-acetamido-6-methoxy-naphthalene is brought into intimate contact with hydrogen in the presence of a hydrogenation catalyst and an organic solvent. I ordinarily utilize as the organic solvent a lower aliphatic alcohol such as ethanol, methanol, and the like. As the hydrogenation catalyst, I can utilize palladium (preferably palladium suspended in activated charcoal (Darco)), or Raney nickel. When palladium is used as the hydrogenation catalyst, the reaction is conveniently carried out at a temperature of about 175° C. and at a hydrogen pressure of about 3000 pounds per square inch. I ordinarily prefer to utilize Raney nickel as the hydrogenation catalyst, in which case the hydrogenation is best conducted at a temperature of about 70–80° C. and under a hydrogen pressure of between 3000 and 6000 pounds per square inch. The hydrogenation reaction is allowed to proceed until two molecular equivalents of hydrogen have been absorbed, whereupon the reaction mixture is filtered to remove the catalyst and the 1-acetamido-6-methoxy-5,6,7,8-tetrahydronaphthalene obtained as the hydrogenation product, is recovered from the filtrate by conventional means, as for example by evaporating the solution and crystallizing the residual material from a lower aliphatic alcohol such as ethanol.

The alkaline hydrolysis of the 1-acetamido-6-methoxy-5,6,7,8-tetrahydronaphthalene is conveniently conducted by heating this compound with an alcoholic solution of an alkali metal hydroxide, such as sodium hydroxide or potassium hydroxide, whereby the acetamide substituent is hydrolyzed without affecting the ether substituent in the 6-position of the molecule, to produce 1-amino-6-methoxy-5,6,7,8-tetrahydronaphthalene. The hydrolysis product is conveniently recovered from the hydrolysis mixture by evaporating the alcohol and extracting the oily mixture thus obtained with an organic solvent such as ether. Upon evaporation of the ether the 1-amino-6-methoxy-5,6,7,8-tetrahydronaphthalene is obtained in the form of an oil which can be converted to a crystalline hydrochloride salt if desired by dissolving the oil in alcohol and adding hydrochloric acid to the alcohol solution whereupon the desired hydrochloride precipitates and can be recovered by filtration.

The conversion of the 1-amino-6-methoxy-5,6,7,8-tetrahydronaphthalene to 1-hydroxy-6-methoxy-5,6,7,8-tetrahydronaphthalene is conveniently carried out by reacting the free amine or its hydrochloride in an aqueous solution with nitrous acid (conveniently prepared by adding a solution of sodium nitrite to a solution of the amine in an aqueous solution containing an excess of mineral acid) whereby the amino radical is converted to a hydroxy group. The oily reaction product is conveniently recovered from the nitrosation mixture by extraction with an organic solvent such as chloroform. Upon evaporation of the dry chloroform extract, the desired 1-hydroxy-6-methoxy-5,6,7,8-tetrahydronaphthalene is obtained as a brownish oil which slowly crystallizes. This material is conveniently purified by distillation under reduced pressure.

The hydrogenation of the 1-hydroxy-6-methoxy-5,6,7,8-tetrahydronaphthalene is ordinarily carried out by bringing this compound into intimate contact with hydrogen in the presence of a lower aliphatic alcohol and a hydrogenation catalyst. It is preferred to utilize Raney nickel as the hydrogenation catalyst, in which case the hydrogenation is ordinarily carried out at a temperature of about 150° C. and at a hydrogen pressure of about 3,000 pounds per square inch. The hydrogenation reaction is allowed to proceed until about three molecular equivalents of hydrogen have been absorbed. The reaction mixture is then filtered, and the solvent is evaporated to give the desired 1-hydroxy-6-methoxy-decahydronaphthalene which is obtained in the form of an almost colorless, heavy oil.

The oxidation of the latter compound to the corresponding keto derivative is conveniently carried out by reacting said 1-hydroxy-6-methoxy-decahydronaphthalene in solution in an organic solvent stable to oxidizing agents, such as glacial acetic acid, with an oxidizing agent such as chromic acid. Where chromic acid is utilized as the oxidizing agent, the oxidation reaction is ordinarily conducted at room temperature, under which conditions, the reaction is substantially complete in approximately forty-eight hours. A reducing agent such as ethanol is added to the solution and the resulting mixture is warmed on a steam bath to destroy the excess oxidizing agent; the solvents are then evaporated under reduced pressure, and the residual material is triturated with an aqueous alkaline solution such as aqueous sodium bicarbonate to dissolve any residual acetic acid, and the aqueous mixture is then extracted with a water-immiscible organic solvent such as chloroform; upon evaporation of the organic extract, there is obtained the desired 1-keto-6-methoxy-decahydronaphthalene in the form of a colorless liquid.

The reaction between the 1-keto-6-methoxy-decahydronaphthalene and ethyl formate is conveniently carried out in solution in a hydrocarbon solvent such as benzene in the presence of sodium methoxide. The reaction is ordinarily carried out at room temperature under which conditions the reaction is substantially complete in about fifteen hours. The product can be recovered from the reaction mixture by adding water to the benzene solution and extracting the aqueous benzene mixture with an aqueous alkali metal hydroxide solution. Upon acidification of the alkaline extract, the desired product separates as an oil which is separated from the aqueous solution by extraction with an organic solvent such as benzene. Upon evaporation of the dry benzene extract, there is obtained the desired 1-keto-2-hydroxymethylene-6-methoxy-decahydronaphthalene in the form of a reddish oil which slowly crystallizes upon standing.

The latter compound is then reacted with isopropyl iodide, preferably by bringing the reactants together in acetone solution and heating the resulting mixture under reflux in the presence of anhydrous potassium carbonate. The product is recovered from the reaction mixture by evaporating the solvent and extracting the residual material with a mixture of ether and water. Upon evaporation of the ether layer, there is obtained 1-keto-2-isopropoxymethylene-6-methoxy-decahydronaphthalene.

The reaction, whereby the angular methyl group is introduced into the molecule, is carried out by treating the 1-keto-2-isopropoxymethylene-6-methoxy-decahydronaphthalene with methyl iodide in the presence of potassium amide. The potassium amide is conveniently prepared by adding potassium metal to liquid ammonia containing a trace of ferric nitrate. The resulting solution of potassium amide in liquid ammonia is then added, dropwise with stirring, to hot dry benzene thereby producing a suspension of potassium amide in benzene. The 1-keto-2-isopropoxymethylene-6-methoxy-decahydronaphthalene and methyl iodide are then added to the suspension of potassium amide and the mixture allowed to remain at room temperature until the reaction is substantially complete. The desired product is recovered from the benzene solution by conventional means to give the desired 1-keto-2-isopropoxymethylene-6-methoxy - 9 - methyl-decahydronaphthalene which is obtained in the form of an oil.

The hydrolysis of the latter compound is carried out by reaction with an aqueous alkaline solution, as for example an aqueous solution of an alkali metal hydroxide such as sodium hydroxide. The hydrolysis reaction is preferably conducted by heating the aqueous alkaline solution under reflux and subjecting the hydrolysis mixture to steam distillation. The oily product is separated from the aqueous portion of the distillate by extraction with a water-immiscible organic solvent such as chloroform. Upon evaporation of the chloroform extract, the desired 1-keto-6-methoxy-9-methyl-decahydronaphthalene is obtained in the form of a yellow oil. This product can be further purified if desired by distillation under reduced pressure.

The 1-keto-6-methoxy-9-methyl-decahydroaphthalene is reacted with potassium acetylide (prepared by bubbling acetylene through a solution of potassium tertiary butylate) thereby forming 1-ethynyl-1-hydroxy-6-methoxy-9-methyl-decahydroaphthalene. The reaction is conveniently carried out in ethereal solution. The reaction mixture is then washed with aqueous hydrochloric acid solution saturated with ammonium chloride and then with a saturated aqueous solution of sodium chloride. The washed ethereal solution is then dried and evaporated to dryness to give the desired 1-ethynyl-1-hydroxy-6-methoxy-9-decahydronaphthalene which can be purified if desired by crystallization from an organic solvent such as methanol.

The reaction between the latter compound and formic acid is conveniently carried out by heating said 1-hydroxy - 1 - ethynyl - 6 - methoxy - 9 - methyl - decahydronaphthalene in an aqueous formic acid solution (containing approximately 90% formic acid) at the boiling point. Under these conditions, the reaction is substantially complete in less than one hour. The reaction product is then diluted with water and the oil which separates is extracted with an organic solvent such as chloroform. The organic extract is washed with an aqueous alkaline solution (to remove residual formic acid) and then with a saturated aqueous solution of sodium chloride. Upon evaporation of the organic extract, there is obtained the desired 1-acetyl-6-methoxy-9-methyl-3,4,5,6,7,8,9,10-octahydronaphthalene which is obtained in the form of a colorless oil. This compound can be converted to steroids in accordance with procedures set forth in the article by Friedmann et al. (Chem. and Ind., 1951, pages 777–778) utilizing the 1-acetyl-6-methoxy-9-methyl-3,4,5,6,7,8,9,10-octahydronaphthalene in place of the 1-acetyl-6-keto - 9 - methyl - 3,4,6,7,8,9-hexahydronaphthalene (Compound IV, page 777, column 1) employed by the Friedmann et al. This reaction, utilizing the claimed 1-acetyl-6-methoxy-9-methyl - 3,4,5,6,7,8,9,10 - octahydronaphthalene may be chemically represented as follows:

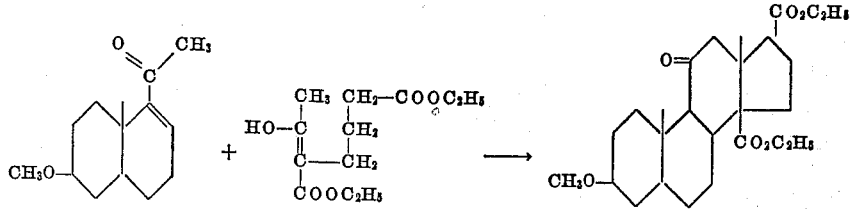

The 4 - methoxy - 11 - keto - 14,17 - dicarboethoxy - etiocholane thus obtained may be then converted by decarboxylation of the ester grouping at C–14 into a steroid having functional groups at positions 3, 11 and 17 which can be readily converted by known methods to steroid hormones.

The following examples illustrate methods of carrying out the present invention, but it is to be understood that these examples are given for purposes of illustration and not of limitation.

*Example 1*

One hundred and fifty-six grams (0.72 mol) of 1-acetamido-6-methoxy-naphthalene (M. P. 142–143° C.) were dissolved in 500 ml. of absolute ethanol, one tablespoonful of Raney nickel catalyst was added to the solution and the mixture was subjected to the action of hydrogen at a pressure of approximately 6000 pound per square inch at a temperature of about 70° C. until two molecular equivalents of hydrogen had been absorbed. The reaction mixture was filtered to remove the catalyst and the filtrate was evaporated under reduced pressure until nearly solid to give approximately 230 g. of product containing about 74 g. (90 milliliters) of residual ethanol. This mixture was then heated, 210 ml. of absolute methanol was added thereto and the resulting solution was allowed to stand at room temperature overnight whereupon crystallization occurred. The crystalline material was recovered by filtration and washed with small portions of ethanol and dried to give 101.4 g. of 1-acetamido-6-methoxy - 5,6,7,8 - tetrahydronaphthalene; M. P. 128–131° C. This material was further purified by recrystallization from 120 ml. of absolute ethanol, to give 92.1 g. of substantially pure 1-acetamido-6-methoxy-5,6,7,8-tetrahydronaphthalene; M. P. 133–134° C.; yield approximately 58% of theory.

A sample of 1-acetamido-6-methoxy-5,6,7,8-tetrahydronaphthalene, recrystallized several times from absolute ethanol, melted at 133–134° C. Analysis: Calc'd for $C_{13}H_{17}O_2N$: C, 71.20; H, 7.82; N, 6.39; Found: C, 71.49; H, 7.64; N, 6.59.

Example 2

Four hundred and thirty grams (2 moles) of 1-acetamido-6-methoxy-naphthalene were dissolved in 1420 ml. of absolute ethanol (pretreated with Raney nickel catalyst), two tablespoonfuls of Raney nickel catalyst were added to the solution, and the mixture was subjected to the action of hydrogen at a pressure of approximately 6000 pounds per square inch at a temperature of about 80° C. until two molecular equivalents of hydrogen had been absorbed. The reaction mixture was filtered thereby removing the catalyst, the filtered reaction solution was evaporated until nearly solid and weighed. A sufficient quantity of hot anhydrous ethanol was added to the concentrated material to make a total of about 780 ml. of ethanol and the resulting solution was allowed to crystallize overnight at room temperature. The crystalline material was recovered by filtration, washed with two small portions of anhydrous ethanol, and dried to give 259 g. of crude 1-acetamido-6-methoxy-5,6,7,8-tetrahydronaphthalene; M. P. 126–130° C. This material was purified by recrystallization from 305 ml. of hot anhydrous ethanol to give 235 g. of substantially pure 1-acetamido-6-methoxy - 5,6,7,8 - tetrahydronaphthalene; M. P. 133–134° C.; yield approximately 53% of theory.

Example 3

Two hundred and twenty-four grams of potassium hydroxide were dissolved in 160 ml. of water, and the solution was diluted wtih 640 ml. of methanol. Two hundred grams of 1-acetamido - 6 - methoxy - 5,6,7,8 - tetrahydronaphthalene (0.91 mole) were added to the solution, and the resulting mixture was heated under reflux for a period of about eight hours. The reaction mixture was evaporated under reduced pressure until substantially all of the methanol had been evaporated. The residual material consists of an alkaline aqueous layer and an oily layer which separated during the evaporation procedure. A small amount of ether was added to the mixture, and the layers were separated utilizing a separatory funnel. The aqueous alkaline solution was extracted twice with ether, and the combined ethereal solutions were dried over anhydrous magnesium sulfate. The dry ethereal solutions were then filtered, and then evaporated to give 165 g. of 1-amino-6-metthoxy-5,6,7,8-tetrahydronaphthalene which was obtained in the form of a reddish oil.

The latter material was dissolved in 500 ml. of methanol and 100 ml. of concentrated aqueous hydrochloric acid was added to the resulting solution. About nine liters of absolute ether was then added, and the precipitate which formed was filtered, washed with ether, and dried to give 185 g. of nearly colorless 1-amino-6-methoxy - 5,6,7,8 - tetrahydronaphthalene hydrochloride; M. P. 228° C. (dec.); yield approximately 94% of theory.

A sample of the latter material was precipitated twice from methanol to give substantially pure 1-amino-6-methoxy - 5,6,7,8 - tetrahydronaphthalene hydrochloride; M. P. 228° C. (dec.). Analysis: Calc'd for $C_{11}H_{15}ON \cdot HCl$:

C, 61.82; H, 7.55; N, 6.56. Found: C, 62.07; H, 7.45; N, 6.59.

Example 4

Six grams (0.028 mole) of 1-amino-6-methoxy-5,6,7,8-tetrahydronaphthalene hydrochloride were dissolved, with stirring, in 50 ml. of water, 4.4 ml. of concentrated aqueous hydrochloric acid solution was added, and the solution was cooled to 4–5° C. Some crystallization occurred. Below the surface of this cold solution was added, with stirring and in small portions, a solution containing 2.07 g. (0.03 mole) of sodium nitrite dissolved in 10 ml. of water. The resulting pale reddish-orange solution was allowed to stand for a period of twenty minutes, and was then added, in small portions over a thirty-minute period, to two hundred ml. of boiling water, whereupon an immediate evolution of nitrogen took place with separation of an oil. The aqueous acidic reaction mixture was cooled, and was then extracted with chloroform. The chloroform extract was dried over anhydrous magnesium sulfate, filtered, and the filtered extract evaporated under reduced pressure to give 4.9 g. of a brown oil, which, upon standing slowly crystallized to a solid; M. P. 74–78° C. This solid was partially dissolved in a solution containing 20 ml. of water and 20 ml. of 2.5 N sodium hydroxide, the insoluble material was removed by thorough extraction of the aqueous mixture with chloroform, and the cooled alkaline layer was then made acid using aqueous hydrochloric acid solution. The acidified solution was then thoroughly extracted with chloroform and the chloroform extract was dried over anhydrous magnesium sulfate. The dry chloroform solution was filtered and the filtered solution was evaporated to give 3.8 g. of brownish oil which slowly crystallized upon standing to a solid having a melting point of 79–81° C. 1.5 grams of this material was distilled in vacuo at a pressure of approximately 1 mm. to give 1.2 g. of 1-hydroxy-6-methoxy-5,6,7,8-tetrahydronaphthalene in the form of a yellow-tinted oil which rapidly crystallized to a solid; M. P. 81–83° C. Analysis: Calc'd for  $C_{11}H_{14}O_2$: C, 74.13; H, 7.92. Found: C, 73.79; H, 7.53.

Example 5

Sixty-seven grams (0.313 mole) of 1-amino-6-methoxy-5,6,7,8-tetrahydronaphthalene hydrochloride were dissolved in 500 ml. of water, 49.74 ml. of concentrated aqueous hydrochloric acid was added to the solution, and the resulting mixture was warmed until solution was complete. The resulting solution was then cooled with stirring to a temperature of about 4–5° C. A solution containing 23.36 g. of sodium nitrite dissolved in 115 ml. of water was added, dropwise with stirring, below the surface of this cooled solution, while maintaining the temperature within the range of approximately 4–5° C. The resulting mixture was allowed to stand for a period of about twenty minutes, and was then added dropwise to 1800 ml. of boiling water whereupon a vigorous evolution of nitrogen took place with the liberation of an oil. The aqueous mixture was cooled and thoroughly extracted with chloroform. The chloroform solution was dried over anhydrous magnesium sulfate, then filtered and the filtered solution evaporated to produce an oil. The foregoing procedure was repeated and the oil obtained from the two runs was combined to give 115 g. of product.

This material (115 g.) was dissolved in ether, and the ethereal solution was extracted successively with: (1) a solution containing 25 g. of sodium hydroxide dissolved in 225 ml. of water, (2) a solution containing 5 g. of sodium hydroxide dissolved in 150 ml. of water and (3) water. The aqueous alkaline extracts and the water extract were combined; the resulting solution was washed with ether, and was then acidified utilizing concentrated aqueous hydrochloric acid. The acidified solution was extracted with chloroform, the chloroform extract was dried over anhydrous magnesium sulfate, and filtered. The filtered chloroform solution was evaporated to give 97.1 g. of an oil which rapidly crystallized. This material was distilled in vacuo to give 74 g. of colored, oily material which distilled at 138–143° C. at a pressure of approximately 1 mm. This product was again distilled in vacuo (1 mm. pressure) to give 70.1 g. of substantially pure 1-hydroxy-6-methoxy-5,6,7,8-tetrahydronaphthalene which solidified to a crystalline solid; M. P. 84–85° C.; yield approximiately 63% of theory.

Example 6

Eleven and six-tenths grams (0.065 mol) of 1-hydroxy-6-methoxy-5,6,7,8-tetrahydronaphthalene (M. P. 84–85° C.) were dissolved in 125 ml. of absolute ethanol, one-half teaspoonful of Raney nickel catalyst was added to the solution, and the resulting mixture was subjected to the action of hydrogen, at a pressure of approximately 3000 pounds per square inch and a temperature of 150° C., until three molecular equivalents of hydrogen had been absorbed. The reaction mixture was filtered to remove the catalyst, and the filtered solution was evaporated under reduced pressure to give approximately 11.8 g. 1-hydroxy-6-methoxy-decahydronaphthalene which was obtained in the form of an almost colorless heavy oil. About 0.1 g. of this material was dried in vacuo over phosphorous pentoxide for a period of about one-half hour at 56° C., and for a period of one-half hour at 28° C. The resulting material was then submitted for elementary analysis without further purification. Analysis: Calc'd for $C_{11}H_{20}O_2$: C, 71.69; H, 10.94. Found: C, 71.22; H, 10.93.

Example 7

Eleven and seven-tenths grams (0.0635 mole) of 1-hydroxy-6-methoxy-decahydronaphthalene were dissolved in 100 ml. of cold glacial acetic acid, and this solution was added to a cold solution prepared by dissolving 4.29 g. (0.0429 mole) of chromic acid in a minimum quantity of water and diluting the resulting solution with 100 ml. of glacial acetic acid. The mixture was maintained at a temperature of approximately 0° C. for a period of about one-half hour, and was then allowed to stand at room temperature for a period of about forty-eight hours. Three milliliters of absolute ethanol were added to the reaction solution, and the solution was warmed on a steam bath for a short period of time to destroy any excess chromic acid. The solvents were then evaporated from the solution in vacuo to give a thick greenish oil. A small amount of water was added to the oil, followed by enough sodium bicarbonate to neutralize the remaining acetic acid. The resulting aqueous solution was thoroughly extracted with chloroform, the chloroform extract was dried over anhydrous magnesium sulfate, and the dry chloroform extract was filtered and evaporated in vacuo to give 10.5 g. of crude 1-keto-6-methoxy-decahydronaphthalene which was obtained in the form of a nearly colorless liquid. This product was characterized by reaction with 2,4-dinitrophenylhydrazine, and the resulting material was twice recrystallized from absolute ethanol to give the 2,4-dinitrophenylhydrazone of 1-keto-6-methoxy-decahydronaphthalene in substantially pure form; M. P. 187–189° C. Analysis: Calc'd for $C_{17}H_{22}O_5N_4$: C, 56.34; H, 6.12; N, 15.46. Found: C, 56.40; H, 6.22; N, 15.47.

Example 8

To a suspension of 153.4 g. (2.84 moles) of sodium methoxide in 2300 ml. of cold dry benzene were added 130 g. (0.71 mole) of 1-keto-6-methoxy-decahydronaphthalene (of at least 80% purity (as shown by isolation of the 2,4-dinitrophenylhydrazone)) and 210.2 g. (2.84 moles) of ethyl formate. The resulting mixture was swirled occasionally until a gel formed with evolution of gas. The resulting mixture was allowed to stand at room temperature for a period of about fifteen hours, cold water was added thereto, and the resulting solution was extracted with two portions of dilute aqueous sodium hydroxide solution. The aqueous alkaline extracts were combined and the solution was washed once with ether, and was then acidified, with cooling, utilizing concentrated hydrochloric acid solution, to a pH of about 2. The oily, hydroxy methylene compound which separated was dissolved in benzene, and the benzene solution was washed with a saturated aqueous solution of sodium chloride until the extracts were neutral. The washed benzene solution was dried over anhydrous magnesium sulfate, filtered and the filtered solution evaporated to give 115.7 g. of 1-keto-2-hydroxymethylene-6-methoxy-decahydronaphthalene which was obtained in the form of a reddish oil which slowly crystallized to a solid; M. P. 70–80° C.

This 115.7 g. of 1-keto-2-hydroxymethylene-6-methoxy-decahydronaphthalene, 241.4 g. of isopropyl iodide and 196 g. of anhydrous potassium carbonate were mixed together in 2400 ml. of acetone. The resulting mixture was heated with stirring, at reflux temperature for a period of about 10 hours. The solvent was evaporated from the reaction mixture under reduced pressure. Ether and water were added to the residual material, the ether layer was separated, and was washed with four portions of dilute aqueous sodium hydroxide solution, and then with a saturated solution of sodium chloride until the washes were neutral. The washed ethereal solution was dried over anhydrous potassium sulfate, filtered and the filtered solution evaporated to give 129.1 g. of 1-keto-2-isopropoxymethylene-6-methoxy-decahydronaphthalene which was obtained in the form of an oil which slowly crystallized to a mass of crystals which contained some oil; M. P. 70–80° C. A sample of this material was twice recrystallized from petroleum ether to give substantially pure 1-keto-2-isopropoxymethylene-6-methoxy-decahydronaphthalene; M. P. 77–79° C. Analysis: Calc'd. for $C_{15}H_{24}O_3$: C, 71.39; H, 9.59. Found: C, 71.46; H, 9.33.

Example 9

About 9.0 g. of potassium was added, in small pieces (each piece having been dipped in tertiary butyl alcohol to remove oil) and over a period of five hours, to a mixture of 0.1 g. of ferric nitrate and 250 ml. of liquid ammonia contained in a 500 ml. dropping funnel. Additional liquid ammonia was added to the mixture from time to time to maintain the volume. The resulting solution of potassium amide was added, dropwise with stirring, to 700 ml. of hot dry benzene, whereupon a gray-white suspension of potassium amide formed. The benzene suspension was heated under reflux while passing a slow stream of nitrogen through the suspension until no more ammonia could be detected.

The suspension was then cooled to below room temperature and to this cooled suspension was added, over a ten-minute period, a solution containing 25 g. (0.1 mole) of 1-keto-2-isopropoxymethylene-6-methoxy-decahydronaphthalene dissolved in 200 ml. of dry benzene, whereupon the color of the mixture rapidly turned red. The mixture was allowed to remain at below room temperature for a period of about thirty minutes, and was then heated with stirring at a temperature of about 36° C. for a period of about sixteen hours. During the first hour, nitrogen gas was passed through the mixture to sweep out the ammonia evolved by the reaction. The reaction mixture was then cooled, and 30 ml. of methyl iodide was added thereto, whereupon the color of the mixture immediately lightened. The resulting mixture was allowed to stand at room temperature for a period of about two hours, and 10 ml. of methyl iodide was then added. The resulting mixture was allowed to stand for an additional five-hour period, and an additional 5 ml. portion of methyl iodide was added to the mixture. The color of the reaction mixture became progressively lighter and, after about eight hours, became a pale yellow. Water was then added to the reaction mixture, and the benzene and water layers were separated. The benzene layer was washed thoroughly with a dilute aqueous solution of potassium hydroxide, and then with a saturated aqueous solution of sodium chloride until neutral. The benzene layer was dried over anhydrous magnesium sulfate, and the benzene evaporated therefrom to give 25.15 g. of crude 1-keto-2-isopropoxymethylene-6-methoxy-9-methyldecahydronaphthalene which was obtained in the form of a reddish oil.

The latter product was heated under reflux for a period of about two hours with 200 ml. of a 5% aqueous solution of sodium hydroxide, and the resulting mixture was subjected to steam distillation. Sodium chloride was added to the combined water and oil distillates until the aqueous phase was saturated therewith, and the mixture was extracted with chloroform. The chloroform extracts were combined, dried over anhydrous magnesium sulfate, and filtered. The dry, filtered chloroform solution was then evaporated to give 17.25 g. of crude 1-keto-6-methoxy-9-methyl-decahydronaphthalene which was obtained in the form of a pale yellow oil; B. P. 154–158° C. (at about 13 mm. pressure); B. P. 131–134° C. (at about 5–6 mm. pressure).

A mixture of 0.2 g. of this 1-keto-6-methoxy-9-methyl-decahydronaphthalene and 0.2 g. of 2,4-dinitrophenylhydrazine in 13 ml. of 95% ethanol was heated for a short period of time. One-quarter milliliter of concentrated aqueous hydrochloric acid was added to the mixture, and the resulting mixture was heated for an additional period. The reaction mixture was cooled, and the crystalline material which separated was recovered by filtration and dried to give 0.27 g. of the 2,4-dinitrophenylhydrazone of 1-keto-6-methoxy-9-decahydronaphthalene; M. P. 138–145° C. This material was twice recrystallized from ethanol to give substantially pure 2,4-dinitrophenylhydrazone of 1-keto-6-methoxy-9-methyl-decahydronaphthalene; M. P. 149–151° C. Analysis: Calc'd for $C_{17}H_{24}O_5N_4$: C, 57.43; H, 6.43; N, 14.89. Found: C, 57.43; H, 6.39; N, 14.82.

*Example 10*

A mixture of 10 g. of potassium and 150 ml. of tertiary butyl alcohol (distilled over sodium) was heated, with stirring and under a nitrogen atmosphere, until the potassium had completely dissolved, which required approximately seven hours. A small additional amount of tertiary butyl alcohol was added during the heating period to prevent crystallization of the potassium tertiary butoxide. After all of the potassium had completely dissolved, 250 ml. of ether (dried over sodium) was added to the solution. Acetylene gas was first passed through traps chilled at a temperature of −60° C. to −40° C., and was then bubbled through the foregoing solution at a moderate rate for a period of approximately one hour. To the resulting mixture was then added, dropwise over a thirty-minute period, a solution containing 10.0 g. of 1-keto-6-methoxy-9-methyl-decahydronaphthalene in 200 ml. of dry ether and 50 ml. of dry benzene. The resulting mixture was stirred for a period of about six hours during which time the addition of acetylene was continued. At the end of this time the ethereal reaction solution had become red-tinted. The ethereal reaction solution was washed with about 500 ml. of a saturated aqueous ammonium chloride solution containing about 20 ml. of concentrated aqueous hydrochloric acid. The ether layer was then washed with four portions of saturated aqueous sodium chloride solution, and was then dried over anhydrous magnesium sulfate and sodium bicarbonate. The dry-ether solution was then filtered and the filtrate evaporated to give 10.6 g. of a reddish oil from which colorless crystals slowly separated. The colorless crystals were purified by twice recrystallizing them from methanol to give substantially pure 1-ethynyl-1-hydroxy-6-methoxy-9-methyl-decahydronaphthalene; M. P. 130–132° C. Analysis: Calc'd for $C_{14}H_{22}O_2$: C, 75.63; H, 9.98. Found: C, 75.79; H, 9.96.

*Example 11*

Six-tenths of a gram of 1-ethynyl-1-hydroxy-6-methoxy-9-methyl-decahydronaphthalene (M. P. 130–132° C.) was mixed with 9 ml. of 98–100% formic acid and 1 ml. of water, and the resulting mixture was heated under gentle reflux for a period of approximately forty-five minutes. Fifty milliliters of cold water was added to the reaction mixture, and the oil which separated therefrom was extracted from the mixture with chloroform. The chloroform extract was washed once with a 10% aqueous solution of sodium hydroxide, and three times with a saturated aqueous solution of sodium chloride. The washed chloroform solution was dried over anhydrous magnesium sulfate, filtered, and the chloroform evaporated from the filtered chloroform solution to give 0.6 g. of crude 1-acetyl-6-methoxy-9-methyl-3,4,5,6,7,8,9,10-octahydronaphthalene which was obtained in the form of a nearly colorless oil.

The foregoing product was converted to the corresponding 2,4-dinitrophenylhydrazone (substantially as described in Example 9), and the crude material was twice recrystallized from ethanol to give substantially pure 2,4-dinitrophenylhydrazone of 1-acetyl-6-methoxy-9-methyl-3,4,5,6,7,8,9,10-octahydronaphthalene; M. P. 168–170° C. Analysis: Calc'd for $C_{20}H_{26}O_5N_4$: C, 59.69; H, 6.51; N, 13.92. Found: C, 60.10; H, 6.30; N, 14.06.

Various changes and modifications may be made in carrying out the present invention without departing from the spirit and scope thereof. Insofar as these changes and modifications are within the purview of the annexed claims, they are to be considered as part of my invention.

I claim:

1. The process which comprises heating 1-ethynyl-1-hydroxy-6-methoxy-9-methyl-decahydronaphthalene with formic acid to produce 1-acetyl-6-methoxy-9-methyl-3,4,5,6,7,8,9,10-octahydronaphthalene.

2. 1-acetyl-6-methoxy-9-methyl-3,4,5,6,7,8,9,10-octahydronaphthalene.

No references cited.